(12) United States Patent  
Saxena et al.

(10) Patent No.: US 9,250,831 B1
(45) Date of Patent: Feb. 2, 2016

(54) ISOLATED SHARED MEMORY ARCHITECTURE (ISMA)

(71) Applicant: INPHI CORPORATION, Santa Clara, CA (US)

(72) Inventors: Nirmal Raj Saxena, Santa Clara, CA (US); Sreenivas Krishnan, Santa Clara, CA (US); David Wang, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 160 days.

(21) Appl. No.: 14/194,574

(22) Filed: Feb. 28, 2014

Related U.S. Application Data

(63) Continuation-in-part of application No. 14/187,082, filed on Feb. 21, 2014, now abandoned.

(60) Provisional application No. 61/781,928, filed on Mar. 14, 2013.

(51) Int. Cl.
| | |
|---|---|
| *G06F 12/10* | (2006.01) |
| *G06F 3/06* | (2006.01) |
| *G06F 13/40* | (2006.01) |
| *G06F 12/08* | (2006.01) |

(52) U.S. Cl.
CPC ............. *G06F 3/0688* (2013.01); *G06F 3/061* (2013.01); *G06F 3/067* (2013.01); *G06F 3/0619* (2013.01); *G06F 3/0631* (2013.01); *G06F 3/0644* (2013.01); *G06F 3/0679* (2013.01); *G06F 12/0813* (2013.01); *G06F 13/4022* (2013.01)

(58) Field of Classification Search
None
See application file for complete search history.

(56) References Cited

U.S. PATENT DOCUMENTS

| 2002/0078408 | A1 | 6/2002 | Chambers et al. | |
|---|---|---|---|---|
| 2006/0294443 | A1 | 12/2006 | Fekih-Romdhane | |
| 2013/0332696 | A1* | 12/2013 | Schmidt | G06F 9/5077 711/173 |
| 2015/0026380 | A1* | 1/2015 | Egi | G06F 13/4022 710/308 |
| 2015/0186069 | A1* | 7/2015 | Sharma | G06F 3/061 711/103 |

OTHER PUBLICATIONS

Office Action for U.S. Appl. No. 13/797,814, dated Apr. 3, 2014.
Open Compute Project, "Home-Open Compute Project", www.opencompute.org, Feb. 2014.
PCI-SIG, "PCI Express Specification", www.pcisig.com, Feb. 2014.
HPCC, "G-RandomAccess GUPs Benchmark", icl.cs.utk.edu/hpcc/index.html, Feb. 2014.

* cited by examiner

*Primary Examiner* — Kevin Verbrugge
(74) *Attorney, Agent, or Firm* — Richard T. Ogawa; Ogawa P.C.

(57) ABSTRACT

Techniques for a massively parallel and memory centric computing system. The system has a plurality of processing units operably coupled to each other through one or more communication channels. Each of the plurality of processing units has an ISMn interface device. Each of the plurality of ISMn interface devices is coupled to an ISMe endpoint connected to each of the processing units. The system has a plurality of DRAM or Flash memories configured in a disaggregated architecture and one or more switch nodes operably coupling the plurality of DRAM or Flash memories in the disaggregated architecture. The system has a plurality of high speed optical cables configured to communicate at a transmission rate of 100 G or greater to facilitate communication from any one of the plurality of processing units to any one of the plurality of DRAM or Flash memories.

20 Claims, 3 Drawing Sheets

| Number of Processors | Total Global Memory (GB) | iSMA G-RandomAccess GUPs | | Closest Competition From HPCC List | Improvement Factor |
|---|---|---|---|---|---|
| | | Base | Optimized | | |
| 8 | 8704 | 2.54 | 12.80 | 0.16 (NEC SX-7) | 80 |
| 16 | 17408 | 5.09 | 25.60 | 0.19 (Intel Endeavor Cluster) | 134 |
| 32 | 34816 | 10.18 | 51.20 | 0.27 (Intel Endeavor Cluster) | 189 |
| 64 | 69632 | 20.36 | 102.40 | 0.55 (Intel Endeavor Cluster) | 186 |
| 128 | 139264 | 40.72 | 204.80 | 0.44 (IBM Power 5+) | 463 |
| 256 | 278528 | 81.44 | 409.60 | 1.14 (NEX SX-9) | 358 |

FIG. 3

ISOLATED SHARED MEMORY ARCHITECTURE (ISMA)

CROSS-REFERENCE TO RELATED APPLICATIONS

The present application claims priority to and is a continuation-in-part of U.S. patent application Ser. No. 14/187,082, filed on Feb. 21, 2014, which is a non-provisional of U.S. Provisional Application No. 61/781,928, filed on Mar. 14, 2013, which are incorporated by reference in their entirety.

BACKGROUND OF THE INVENTION

The present invention is directed to computing systems and methods. These computing systems can be applied to communications networks and the like.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

CMOS technology is commonly used to design communication systems implementing Optical Fiber Links. As CMOS technology is scaled down to make circuits and systems run at higher speed and occupy smaller chip (die) area, the operating supply voltage is reduced for lower power. Conventional FET transistors in deep-submicron CMOS processes have very low breakdown voltage as a result the operating supply voltage is maintained around 1 Volt. These limitations provide significant challenges to the continued improvement of communication systems scaling and performance.

There have been many types of communication systems and methods. Unfortunately, they have been inadequate for various applications. Therefore, improved computing/communication systems and methods are desired.

BRIEF SUMMARY OF THE INVENTION

According to the present invention, techniques are directed to computing systems and methods. Additionally, various embodiments enable separate computer systems having such memory systems to send and receive data to and from other memory systems having such auxiliary interfaces.

In an example, the present invention provides a massively parallel and memory centric computing system. The system has a plurality of processing units operably coupled to each other through one or more communication channels. Each of the plurality of processing units has an ISMn interface device. Each of the plurality of ISMn interface devices is coupled to an ISMe endpoint connected to each of the processing units. The system has a plurality of DRAM or Flash memories configured in a disaggregated architecture and one or more switch nodes operably coupling the plurality of DRAM or Flash memories in the disaggregated architecture. The system has a plurality of high speed optical cables configured to communicate at a transmission rate of 100 G or greater to facilitate communication from any one of the plurality of processing units to any one of the plurality of DRAM or Flash memories.

Many benefits are recognized through various embodiments of the present invention. Such benefits include having an architecture exhibiting superior power efficiency and in-memory computing efficiency. This architecture can involve disaggregating a large pool of memory (NAND flash or DRAM) that is shared amongst multiple CPU server nodes. Another benefit includes low-latency and high-bandwidth interconnect architecture amongst multiple CPU server nodes. Other benefits will be recognized by those of ordinary skill in the art that the mechanisms described can be applied to other communications systems as well.

The present invention achieves these benefits and others in the context of known memory technology. These and other features, aspects, and advantages of the present invention will become better understood with reference to the following description, figures, and claims.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 3 is a table with information regarding the computing systems according to an embodiment of the present invention.

DETAILED DESCRIPTION OF THE INVENTION

Figure 1:
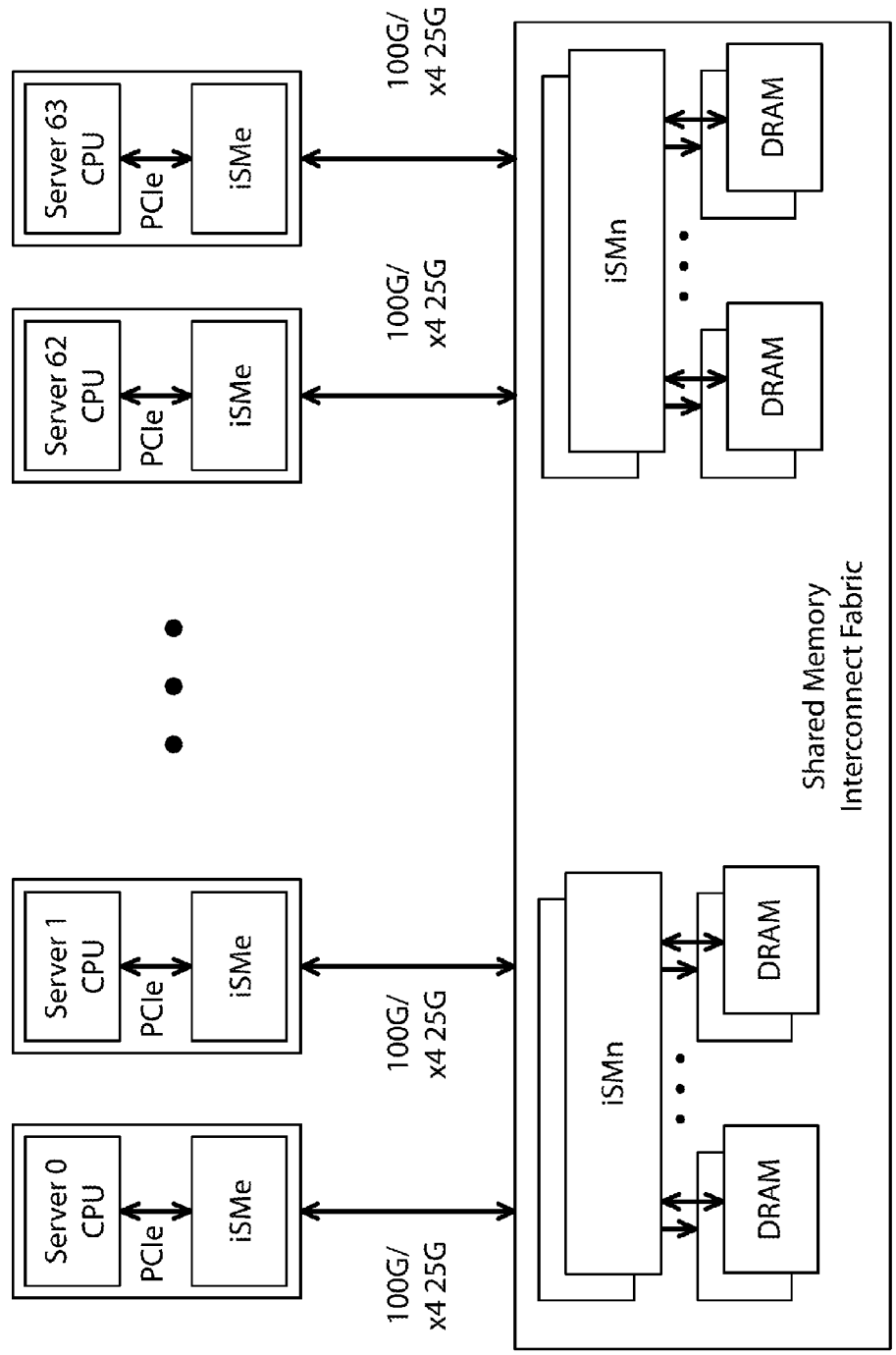
FIG. 1 is a simplified architecture of a shared memory system according to an embodiment of the present invention.

According to the present invention, techniques are directed to computing systems and methods. Additionally, various embodiments enable separate computer systems having such memory systems to send and receive data to and from other memory systems having such auxiliary interfaces.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

This invention describes an architecture for disaggregating a large pool of memory (NAND flash or DRAM) that is shared amongst multiple CPU server nodes. Another aspect of this invention is a low-latency and high-bandwidth interconnect architecture amongst multiple CPU server nodes. The notion of disaggregating storage, memory, and IO devices from monolithic designs is gaining importance and is being driven by the following considerations:

Much of today's hardware is highly monolithic in that our CPUs are inextricably linked to our motherboards, which in turn are linked to specific networking technology, IO, storage, and memory devices. This leads to poorly configured systems that cannot adapt to evolving software and waste lots of energy and material. Disaggregation is a way to break these monolithic designs.

Disaggregation allows independent replacement or upgrade of various disaggregated components. This reduces upgrade costs as opposed to increased costs due to gratuitous upgrade of components in monolithic designs.

FIG. 1 illustrates a block diagram of a 64-server node iSMA. iSMA comprises two components: 1) a PCI-express endpoint device called iSMe and 2) a switching node called iSMn. Each of the server CPUs has a local DRAM (not shown in FIG. 1) and is connected to PCIe endpoint iSMe. The iSMe components of each server node connect to one of the iSMn switch nodes. Attached to each iSMn node is a plurality of DRAM memory channels (shown in FIG. 1) or flash memory devices (not shown in FIG. 1). All of the iSMn nodes are interconnected thereby forming a shared memory interconnect fabric.

The following describes a mode of operation of iSMA according to an embodiment of the present invention. Upon power-on or system boot, each of the iSMn nodes discovers the locally attached DRAM or flash memory capacity. The iSMn nodes broadcast amongst each of the connected nodes the DRAM/flash memory capacity and the topology information. After a settling time, all of the iSMn nodes learn the topology as well as the sum-total memory capacity information. The topology information comprises the number of connected server CPUs and identification of the connected server CPUs to the iSMn nodes.

The iSMn nodes communicate the topology and memory capacity information to the iSMe endpoints via upstream transactions. The iSMe nodes subsequently communicate this topology and sum-total memory capacity information to their respective server CPUs during PCIe enumeration. In particular, the sum-total memory capacity information is reported to the respective server CPU as an address range in a PCIe endpoint base address register (BAR).

The reporting of the sum-total memory through a BAR allows each of the server CPUs to have a common address view of the disaggregated memory. Also, the BAR range reporting of the disaggregated memory allows mapping of the physical address range of disaggregated memory into a common virtual address range. Thereby allowing caching of virtual to physical address translations of disaggregated memory via the translation look-aside buffers in the server CPUs.

The visibility of the disaggregated memory as a common virtual address simplifies programming models. Also, sharing of this common pool of disaggregated memory by server CPUs is decided through software convention and is influenced by the application use case models.

In an example, the iSMn nodes also have processing capability to do data transformation operations to the locally connected memory. The server CPUs, through posted-write transactions or through downloaded executable programs in disaggregated memory, communicate the nature of data transformation. The iSMn nodes with their local processing capability act upon these posted transactions or executable programs to perform data transformation operations. These data transformation operations are often called in-memory computations.

Figure 2:
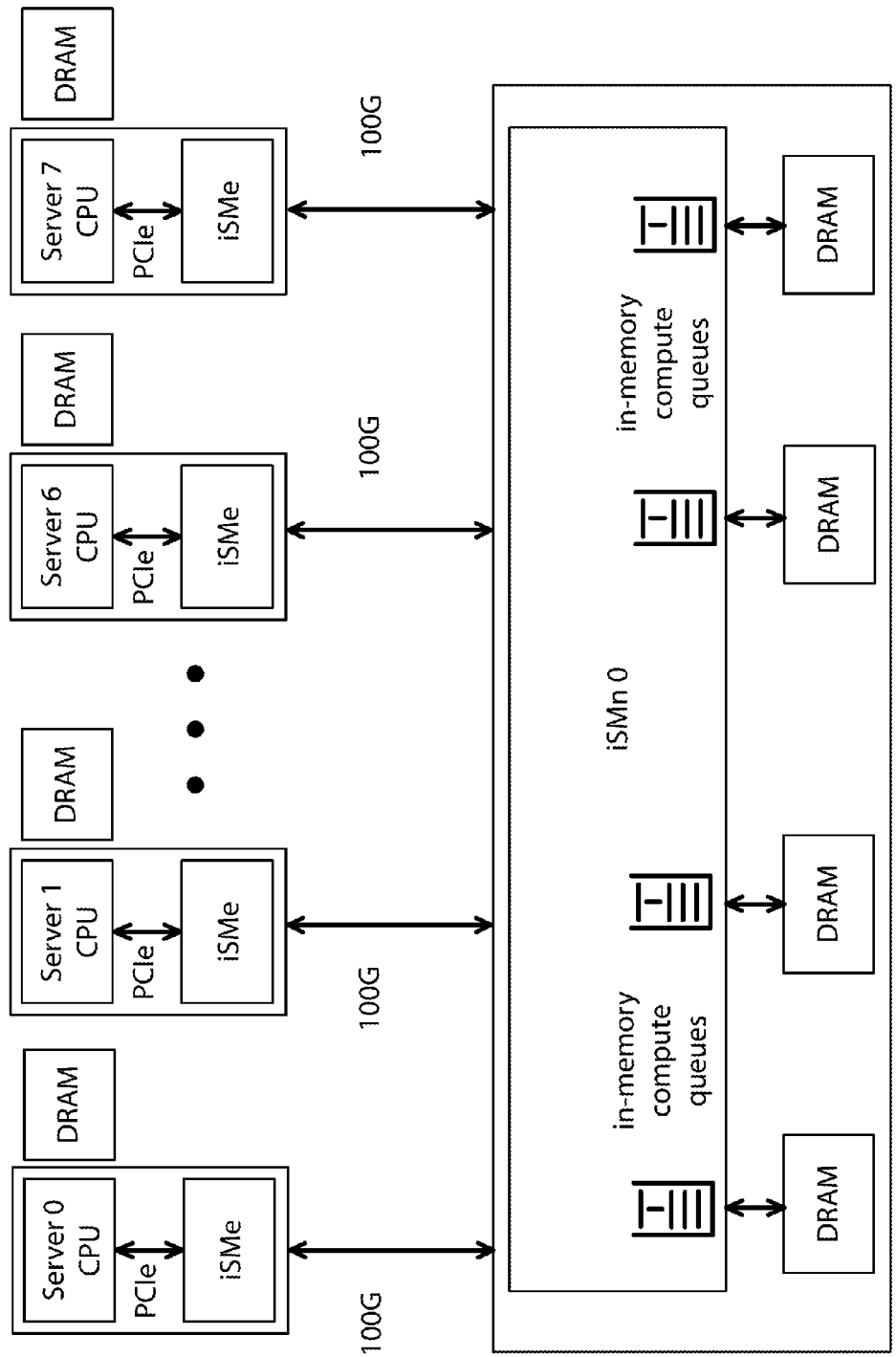
FIG. 2 is a simplified architecture of an in memory computing system according to an embodiment of the present invention.

FIG. 2 is a simplified architecture of an in memory computing system according to an embodiment of the present invention. In-memory compute capability allows server CPUs to off-load various data transformation operations for large pools of data stored in disaggregated memory to iSMn nodes. This offloading of operations is mostly beneficial both in performance and energy for large data set payloads that show poor cache locality. Thereby, moving computation closer to the memory results in both power and performance efficiency. FIG. 2 illustrates the in-memory compute idea for an 8-server node configuration connected via iSMe endpoints to a single iSMn node.

FIG. 3 is a table with information regarding the computing systems according to an embodiment of the present invention. To demonstrate the efficiency of in-memory compute capability of the iSMn nodes, we estimated the performance improvement in GUPs benchmark. The following table illustrates the performance improvements estimates. The estimates demonstrate that we can get from two to three orders of magnitude performance improvement by offloading data transformation operations to disaggregated memory for GUPs class of applications.

In various embodiments, a memory buffer as described herein could be implemented as a single integrated circuit (IC), or with a multiple chip chipset with various functions spread among several ICs. For example, a memory system based on the DDR4 standard employs DIMMs which include nine separate data buffer chips arranged close to the connector contacts and provides an interface between the connector and the DRAMs. The standard also provides for a central control element which functions as the register section of the DIMM and includes an extra interface to control the data buffers. For this type of chipset implementation, implementing an auxiliary port as described herein requires a new path from the data buffers to the central controller.

In an embodiment, the present invention can include a massively parallel and memory centric computing system. This system can include a plurality of processing units operably coupled to each other through one or more communication channels. Each of the plurality of processing units can have an ISMn (Isolated Shared Memory network) interface device. Each of the plurality of ISMn interface devices can be coupled to an ISMe (Isolated Shared Memory endpoint) device connected to each of the processing units. Each of the plurality of processing units can be numbered from 1 through N, where N is an integer greater than or equal to 32. Each of these processing units can be an ARM or an Intel based x86 processor.

In a specific embodiment, the system can be configured to initiate a power on or system boot. Each of the iSMn interface devices can be configured to determine a capacity of any one or all of the plurality of DRAM or Flash memories. Each of the iSMn interface devices can be configured to communicate in a broadcast process among any other iSMn interface device, each of which can be coupled to at least one of the plurality of DRAM or Flash memories. This broadcast process can be provided to determine a capacity and a topology of any or all of the system including the plurality of DRAM or Flash memories or networking configuration. The topology can include information selected from at least one of a number of connected processing units and identification information of the processing units to the iSMn devices.

Also, each of the iSMn devices can be configured to initiate communication of the topology can capacity information to any one or all of the iSMe devices using a communication direction from iSMn devices to the iSMe devices. Each of the iSMe devices can be configured to thereafter communicate the topology and a collective capacity of a sum-total of the capacity to a particular processing unit during a PCIe enumeration process. The sum-total memory capacity information can be transferred to a particular processing unit as an address range in a PCIe endpoint base address register.

The transferring of the sum-total memory capacity can be provided using a base address register (BAR) characterized by allowing each of the processing units to have a common address view of the disaggregated memory. The BAR range reporting of the disaggregated memory can allow mapping of a physical address range of the disaggregated memory into a common virtual address range. This can allow the caching of a virtual to physical address translation of the disaggregated memory provided by a translation look-aside buffer in the processing unit. The common address view of the disaggregated memory can be configured as a common virtual address.

A plurality of DRAM or Flash memories can be configured in a disaggregated architecture. One or more switch nodes can be operably coupled to the plurality of DRAM or Flash memories in the disaggregated architecture. Also, a plurality of high speed optical cables can be configured to communicate at a transmission rate of 100 G or greater to facilitate communication from any one of the plurality of processing units to any one of the plurality of DRAM or Flash memories. Each of the plurality of high speed optical cables can have a length of 1 meter to about 10 kilometers. The transmission rate can be 100 G PAM or other protocol.

The embodiments shown in the figures and described above are merely exemplary. The present system encompasses any memory system which employs a memory buffer that serves as an interface between the individual memory chips on a DIMM and a host, and which includes at least one additional, auxiliary interface which enables the memory buffer to serve as an interface between the host and/or memory chips and additional external devices.

In other embodiments, a system may include more than one host computer (each with host controller) wherein each host computer includes a memory buffer having a RAM interface and an auxiliary interface, as described herein. The auxiliary interfaces of the memory buffer of one host computer may be directly coupled to an auxiliary interface of the memory buffer of another host computer, or may be coupled via one or more switches. As described herein, such configurations enable the transfer of data from one RAM to another RAM bypassing data paths of the host controllers.

Various example embodiments as described with reference to the accompanying drawings, in which embodiments have been shown. This inventive concept may, however, be embodied in many different forms and should not be construed as limited to the embodiments set forth herein. Rather, these embodiments are provided so that this disclosure is thorough and complete, and has fully conveyed the scope of the inventive concept to those skilled in the art. Like reference numerals refer to like elements throughout this application.

It has been understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It has be understood that when an element is referred to as being "connected" or "coupled" to another element, it can be directly connected or coupled to the other element or intervening elements may be present. In contrast, when an element is referred to as being "directly connected" or "directly coupled" to another element, there may be no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It has been be further understood that terms, such as those defined in commonly used dictionaries, should be interpreted as having a meaning that is consistent with their meaning in the context of the relevant art and will not be interpreted in an idealized or overly formal sense unless expressly so defined herein.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A massively parallel and memory centric computing system, the system comprising:
   a plurality of processing units operably coupled to each other through one or more communication channels, each of the plurality of processing units having an ISMn (Isolated Shared Memory network) interface device, each of the plurality of ISMn interface devices being coupled to an ISMe (Isolated Shared Memory endpoint) devices connected to each of the processing units;
   a plurality of DRAM or Flash memories configured in a disaggregated architecture;

one or more switch nodes operably coupling the plurality of DRAM or Flash memories in the disaggregated architecture; and a plurality of high speed optical cables configured to communicate at a transmission rate of 100 G or greater to facilitate communication from any one of the plurality of processing units to any one of the plurality of DRAM or Flash memories.

2. The system of claim 1 wherein each of the plurality of high speed optical cables having a length of 1 meter to about 10 kilometers.

3. The system of claim 1 wherein the transmission rate is 100 G PAM or other protocol.

4. The system of claim 1 wherein the plurality of processing units is a number from 1 through N, where N is an integer greater than or equal to thirty two.

5. The system of claim 1 wherein each of the processing units is either an ARM or an Intel based x86 processor.

6. The system of claim 1 wherein the system is configured to initiate a power on or system boot, each of the iSMn interface devices being configured to determine a capacity of any one or all of the plurality of DRAM or Flash memories.

7. The system of claim 1 wherein each of the iSMn interface devices is configured to communicate in a broadcast process among any other iSMn interface device, each of which is coupled to at least one of the plurality of DRAM or Flash memories; whereupon the broadcast process is provided to determine a capacity and a topology of any or all of the system including the plurality of DRAM or Flash memories or networking configuration.

8. The system of claim 7 wherein the topology comprises information selected from at least one of a number of connected processing units and identification information of the processing units to the iSMn devices.

9. The system of claim 8 wherein each of the iSMn devices is configured to initiate communication of the topology and capacity information to any one or all of the iSMe devices using a communication direction from iSMn devices to the iSMe devices.

10. The system of claim 9 wherein each of the iSMe devices is configured to thereafter communicate the topology and a collective capacity of a sum-total of the capacity to a particular processing unit during a PCIe enumeration process.

11. The system of claim 10 wherein the sum-total memory capacity information is transferred to a particular processing unit as an address range in a PCIe endpoint base address register.

12. The system of claim 11 wherein transferring of the sum-total memory capacity is provided using a base address register (BAR) characterized by allowing each of the processing units to have a common address view of the disaggregated memory.

13. The system of claim 12 wherein the BAR range reporting of the disaggregated memory is configured to provide a mapping of a physical address range of the disaggregated memory into a common virtual address range, thereby configured to provide caching of a virtual to physical address translation of the disaggregated memory provided by a translation look-aside buffer in the processing unit.

14. The system of claim 13 wherein the common address view of the disaggregated memory is configured as a common virtual address.

15. A massively parallel and memory centric computing system, the system comprising:

a plurality of processing units operably coupled to each other through one or more communication channels;

an ISMe (Isolated Shared Memory endpoint) device coupled to each of the processing units;

an ISMn (Isolated Shared Memory network) interface device coupled to each of the ISMe devices;

a plurality of DRAM or Flash memories configured in a disaggregated architecture and coupled to the plurality of iSMn interface devices;

one or more switch nodes operably coupling the plurality of DRAM or Flash memories in the disaggregated architecture; and a plurality of high speed optical cables configured to communicate at a transmission rate of 100 G or greater to facilitate communication from any one of the plurality of processing units to any one of the plurality of DRAM or Flash memories.

16. The system of claim 15 wherein each of the iSMn interface devices is configured to communicate in a broadcast process among any other iSMn interface device, each of which is coupled to at least one of the plurality of DRAM or Flash memories; whereupon the broadcast process is provided to determine a capacity and a topology of any or all of the system including the plurality of DRAM or Flash memories or networking configuration.

17. The system of claim 16 wherein the topology comprises information selected from at least one of a number of connected processing units and identification information of the processing units to the iSMn devices; and wherein each of the iSMn devices is configured to initiate communication of the topology and capacity information to any one or all of the iSMe devices using a communication direction from iSMn devices to the iSMe devices.

18. The system of claim 17 wherein each of the iSMe devices is configured to thereafter communicate the topology and a collective capacity of a sum-total of the capacity to a particular processing unit during a PCIe enumeration process; and wherein the sum-total memory capacity information is transferred to a particular processing unit as an address range in a PCIe endpoint base address register.

19. The system of claim 18 wherein transferring of the sum-total memory capacity is provided using a base address register (BAR) characterized by allowing each of the processing units to have a common address view of the disaggregated memory; and wherein the BAR range reporting of the disaggregated memory is configured to provide a mapping of a physical address range of the disaggregated memory into a common virtual address range, thereby configured to provide caching of a virtual to physical address translation of the disaggregated memory provided by a translation look-aside buffer in the processing unit.

20. The system of claim 19 wherein the common address view of the disaggregated memory is configured as a common virtual address.

\* \* \* \* \*